Patented Oct. 16, 1951

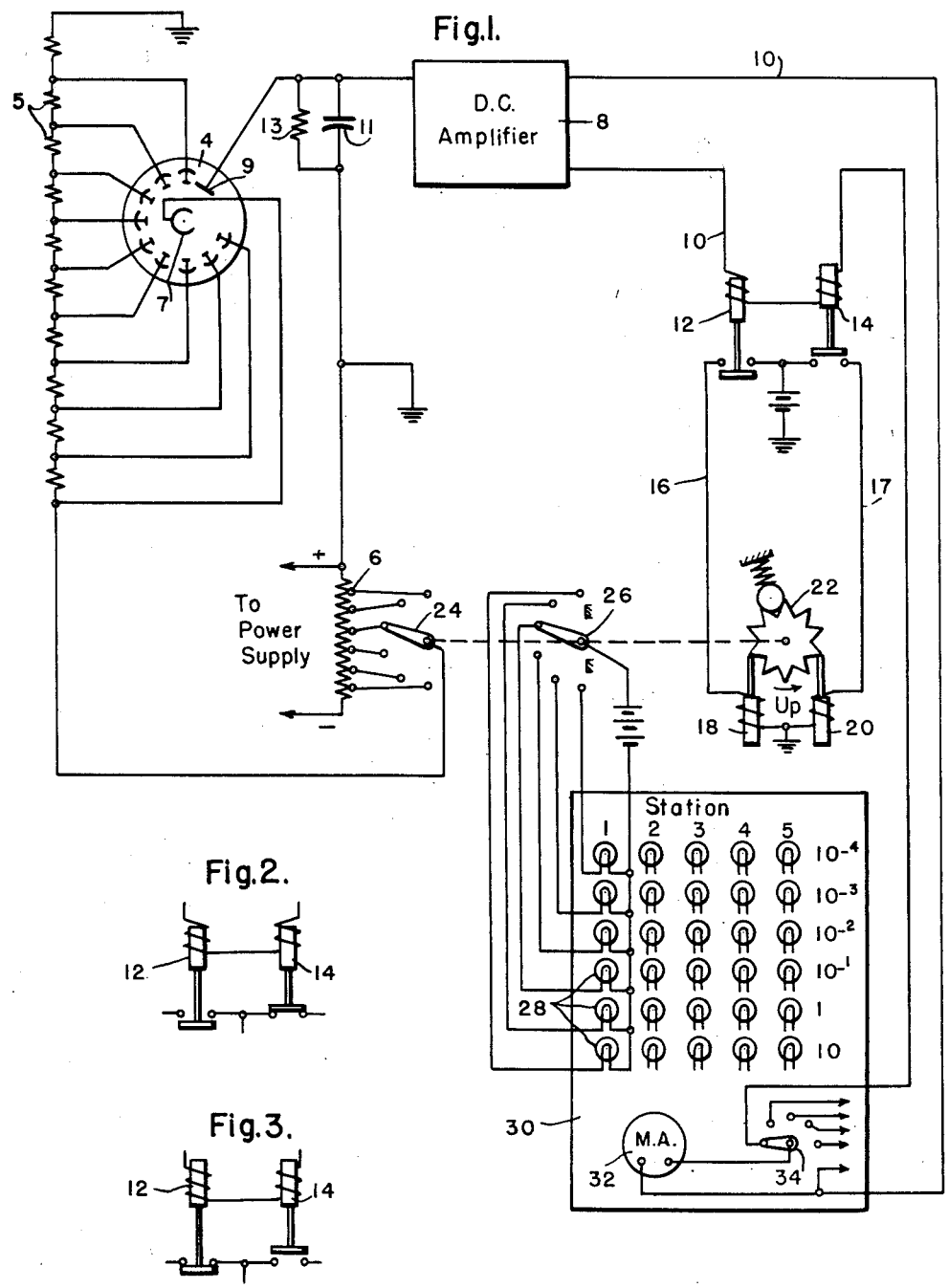

2,571,838

UNITED STATES PATENT OFFICE 2,571,838

CONTROL MEANS FOR RADIATION DETECTORS

John C. Connor, Wilkinsburg, Pa., and Ted Fahrner, Whittier, Calif., assignors to Westinghouse Electric Corporation, East Pittsburgh, Pa., a corporation of Pennsylvania Application December 3, 1949, Serial No. 130,954

4 Claims. (Cl. 250—209)

Our invention relates to radiation detectors and more particularly to controls for radiation detectors.

Radiation detectors built in accordance with teachings of the prior art of which we are aware, include potential supply means for the detector tube with manual adjustment. The manual adjustment of this potential consumes considerable time. It is particularly undesirable around a manufacturing plant or similar installation where numerous radiation detectors are used, and the readings on each are desired in a central control room. Automatic controls for radiation detectors have been developed. For example, logarithmic radiation detectors with automatic control is disclosed in an application, Serial No. 115,445, filed September 13, 1949, to Kenneth N. Fromm and assigned to Westinghouse Electric Corporation. Such detectors are on the whole satisfactory. However, their range of automatic response is such that the whole range of operation of the detector is covered by a single scale and this scale must be relatively long. These devices require meters with sectional scale lengths substantially the same for each power of ten to which they are to be sensitive. Thus a logarithmic scale from one to one hundred would require a section of the scale length at least as long for the region 10 to 100 as it required from 1 to 10. If a detector of this type is to read from one to a million, the total scale length becomes at least six times as long as a scale from one to ten with the same percent of accuracy.

It is, therefore, an object of our invention to provide apparatus for automatically controlling the potential on a radiation detector of the type wherein the intensity of radiation incident on the radiation detector can be measured by a linear scale meter of small range.

Another object of our invention is to provide apparatus for determining the radiation incident on a radiation detector, the sensitivity of said apparatus increasing automatically by a large increment when the incident radiation intensity falls below certain limits.

An ancillary object of our invention is to provide apparatus for determining the radiation incident on a radiation detector, the sensitivity of which will decrease automatically by a large increment when the current exceeds a certain predetermined maximum.

Still another ancillary object of our invention is to provide apparatus for detecting radiation in which the potential across the radiation detector is caused to increase automatically by a predetermined quantity when the meter registering the current through the radiation detector reaches a predetermined point, and having means for showing to an operator the potential applied at any time to the radiation detector.

In accordance with our invention, we provide a circuit for impressing a variable potential on the electrodes of a photomultiplier tube of a radiation detector. An amplifier is connected in such a manner to the tube as to be responsive to the current through the tube. The output circuit of this amplifier we shall call the primary output circuit. Connected in the primary output circuit are two relays, the first of which is responsive to a predetermined minimum current, and the second of which is responsivve to a predetermined maximum current. Connections, both mechanical and electrical, are supplied between the first and second relays and the source of potential. These connections are so constructed that the following effects will result: When current between the predetermined minimum and the predetermined maximum is present in the primary output circuit, the first relay is energized but the second relay is not energized. The first relay, when energized, causes no change in the potential of the radiation detector source of potential, when the current drops below the minimum predetermined current, and the first relay drops back to its initial position. When the first relay drops back to the initial position, it will actuate the controls on the radiation detector potential source in such manner as to increase the potential applied to the radiation detector. When a current above the predetermined maximum is present in the primary output circuit, the second relay is energized and causes the control of the source of potential to decrease that potential. A light selector switch for controlling the current in several light bulbs is connected electrically and mechanically to the first and second relays. The current is so controlled that when the potential of the radiation detector potential source is of a certain magnitude, a particular light bulb is energized, and indicates the sensitivity range in which the detector is operating. These lights, as well as the current meter which registers the current through the radiation detector, and a switch which selects the radiation detector to which the current meter is responsive, should preferably be placed in a central control room.

The novel features which we consider characteristic of our invention are set forth with more particuarity in the appended claims. The invention, however, with respect to both the organization and the operation thereof, together with other objects and advantages, may be best understood from the following description of specific embodiments when read in connection with the accompanying drawings, in which:

Figure 1 is a schematic view of apparatus embodying our invention.

Fig. 2 is a schematic view of the two relays in the primary output circuit when the current is below a predetermined quantity; and Fig. 3 is a schematic view of the two relays in the primary output circuit when the current through the primary output circuit is above a predetermined maximum.

The apparatus shown in Fig. 1 comprises a photomultiplier tube 4, the dynodes of which are connected to a series of dynode divider resistances 5. The cathode 7 of the photomultiplier tube 4 is connected at one end of the series of dynode divider resistances 5 which in turn are connected to the arm of a potentiometer which is the negative side of a potentiometer 6. The positive side of the potentiometer 6 is connected to ground. The positive side of the series of dynode resistors 5 is also connected to ground through a resistance which is equal in magnitude to the dynode divider resistances. The anode 9 of the photomultiplier tube is connected through an integrating condenser 11 and an anode load resistance 13 in parallel to ground. The anode 9 of the photomultiplier tube is also connected to a direct-current amplifier 8.

The output circuit 10 of the amplifier 8, which we call the primary output circuit, has connected therein a first relay 12 and a second relay 14. Secondary output circuits 16, 17 are connected so as to be responsive to the positions of the first and second relays 12, 14. The secondary output circuits 16 and 17 have therein a third relay 18 and a fourth relay 20. The third relay 18 is responsive to the action of the first relay 12 and the fourth relay 20 is responsive to the action of the second relay 14.

The first relay 12 is energized by a current of 20 milliamperes or more and the second relay 14 is energized by a current of 2 milliamperes or more in the output circuit of the D. C. amplifier. Thus when a current of 3 milliamperes is passing through the primary output circuit 10, the second relay 14 will be energized and the first relay 12 will not be energized. The second relay 14 is so connected to its secondary output circuit 17 that when the second relay 14 is energized, its second output circuit 17 is open, and the fourth relay 20 is not energized. If, however, the current were to drop below 2 milliamperes the second relay 14 would no longer be energized and it would return to its rest position, thus closing its secondary output circuit 17. When the secondary output circuit 17 of the second relay 14 is closed, the fourth relay 20 is energized.

In the opposite manner, the first relay 12, when energized, closes its secondary output circuit 16, and when not energized opens its secondary output circuit 16. Thus, the third relay 18 is not energized when the first relay is not energized, which is when the current is less than 20 milliamperes. When the current in the primary output circuit exceeds 20 milliamperes, the first relay 12 is energized and therefore the fourth relay 18 is energized.

Responsive to the third and fourth relays is a reversible ratchet 22. This ratchet is caused to move in a clockwise direction when the third relay is energized and in a counterclockwise direction when the fourth relay is energized. The potentiometer which controls the voltage on the phototube is connected mechanically to this ratchet and also a lamp selector switch 26. When one of the third or fourth relays is energized, the ratchet 22 is caused to turn from one position to an adjacent position and the potentiometer and the light selector switches 24, 26 connected thereto are caused to move to corresponding positions. Thus, for a particular position of the ratchet, there is a particular position for the lamp selector switch 26 and for the potential control switch 24. The lamp selector switch is connected to lamps 28 on the panelboard 30 in such manner that when the lamp selector switch is in a particular position, the corresponding lamp on the panelboard 30 will light. Connected in the primary output circuit 10 is also a linear scale milliammeter 32 for recording the current through the photomultiplier tube 4, and a station selector switch 34 for selecting the photomultiplier tube to which the control board 30 is to be responsive.

When radiation is incident on the photocathode on the photomultiplier tube, an electron current is produced within the tube. This electron current passes through the anode of the photomultiplier tube and through the load resistance to the positive terminal of the potentiometer. This photomultiplier current passing through the load resistance causes a potential to be developed across that resistance. The potential developed across the anode load resistance is integrated by the integrating condenser 11 and the resultant potential is applied to the D.-C. amplifier 8. If the current output of the D.-C. amplifier is 3 milliamperes, the first relay being unenergized will be open and the second relay being energized will also be open. The milliammeter 32 will read 3 milliamperes. If the current output of the D.-C. amplifier drops below 2 amperes, the second relay will no longer be energized and will close the second output circuit 17. When the second output circuit 17 is closed, the fourth relay 20 will be energized and will cause the ratchet 22 to turn. When the ratchet 22 turns in a counterclockwise direction under the action of the fourth relay, it will cause the lamp selector switch 26 and the potential control switch 24 to move to positions corresponding to a higher potential. When the potential control switch moves to a higher potential, it impresses a higher potential across a series of dynode resistors 5 which increases the potential on each of the dynodes on each of the photomultiplier tubes. When the potential of the dynodes of the photomultiplier tube is increased, the current through the photomultiplier tube will be caused to increase if the intensity of the radiation incident on the photocathode of the photomultiplier tube remains constant. This will cause a corresponding increase in the reading of the milliammeter. The milliammeter will now read just below 20 milliamperes instead of just below 2 milliamperes as it read before the potential on the series of dynode resistors was increased. The light selector switch which has moved to a new position will now cause a different lamp on the control panel to be lighted. This lamp will then indicate a different factor on the right side of the panel, as shown in Fig. 1, by which the reading of the milliammeter is to be multiplied to give a correct indication of the intensity of the incident radiation. Since the current through the first and second relays has now increased, the second relay will be again energized and the fourth relay will no longer be energized. Therefore no further increase in potential will occur.

Should the current through the milliammeter increase above 20 milliamperes, the first relay will be energized, thus closing its second output circuit and causing the third relay to be energized. When the fourth relay is energized, it will cause a clockwise rotation of the ratchet and consequent decrease in the potential applied to the series of dynode resistors and will cause a different lamp on the control panel to light, thus indicating a higher factor by which the milliampere reading is to be multiplied to give a correct indication of the incident radiation.

We thus have provided a control system for radiation detectors whereby a large number of radiation detectors may be placed at different positions around a manufacturing plant or similar installation and the radiation intensity in the region of any of these detectors may be determined from a centralized control station without the use of large and cumbersome instrument boards. Our apparatus also has the advantage that if a certain radiation intensity is considered safe and information is desired only when the intensity reaches above this level, an operator can tell by a glance at the lamps what the order of radiation intensity is, without reading the milliammeter. Since the scale of the milliammeter is linear instead of logarithmic, more accurate readings may be made. Generally, at least one additional significant figure can be read with our device if the same size scale is used in both our detector and a logarithmic detector.

Although we have shown and described specific embodiments of our invention, we are aware that other modifications thereof are possible. Our invention, therefore, is not to be restricted except insofar as is necessitated by the prior art and the spirit of the invention.

We claim as our invention:

1. In combination, a photomultiplier tube, connections for applying a potential to said tube, control means capable of regulating the potential applied to said connections, a primary output circuit for transmitting current dependent on the output of said tube, said primary output circuit having connected therein a first relay responsive to a predetermined minimum current, a second relay responsive to a predetermined maximum current, and a current meter, a secondary output circuit having connected therein, translating means responsive to the current in said secondary output circuit, and connections between said translating means and said control means for actuating said control means, means responsive to said secondary output circuit for registering the potential applied to said connections.

2. In combination, a photomultiplier tube, a potential control, said potential control being capable of controlling the potential applied to said photomultiplier, current responsive apparatus responsive to currents below a predetermined minimum and above a predetermined maximum, mechanical connections between said current responsive apparatus and said potential control, for actuating said control in accordance with the response of said apparatus, range indicating apparatus for indicating the sensitivity range on which said tube is operating, and mechanical connections between said range indicating apparatus and said potential control.

3. In combination, photoresponsive apparatus which produces a logarithmic output, connections for applying a potential to said photoresponsive apparatus, control means capable of regulating the potential applied to said connections, a primary output circuit for transmitting current dependent on the output of said photoresponsive apparatus, said primary output circuit having connected therein a first relay responsive to a predetermined minimum current, a second relay responsive to a predetermined maximum current, and a current meter, a secondary output circuit having connected therein, translating means responsive to the current in said secondary output circuit, and connections between said translating means and said control means for actuating said control means, means responsive to said secondary output circuit for registering the potential applied to said connections.

4. In combination, photoresponsive apparatus which produces a logarithmic output, a potential control, said potential control being capable of controlling the potential applied to said photomultiplier, current responsive apparatus responsive to currents below a predetermined minimum and above a predetermined maximum, mechanical connections between said current responsive apparatus and said potential control for actuating said control in accordance with the response of said apparatus, range indicating apparatus for indicating the sensitivity range on which said photoresponsive apparatus is operating, and mechanical connections between said range indicating apparatus and said potential control.

JOHN C. CONNOR.
TED FAHRNER.

REFERENCES CITED

The following references are of record in the file of this patent:

UNITED STATES PATENTS

| Number | Name | Date |
| --- | --- | --- |
| 2,368,582 | Sziklai | Jan. 30, 1945 |
| 2,438,303 | Simmon | Mar. 23, 1948 |